Dec. 7, 1965  J. V. SAVISKAS  3,221,705
TIP-UP SIGNAL FOR FISHING RODS
Filed April 5, 1965
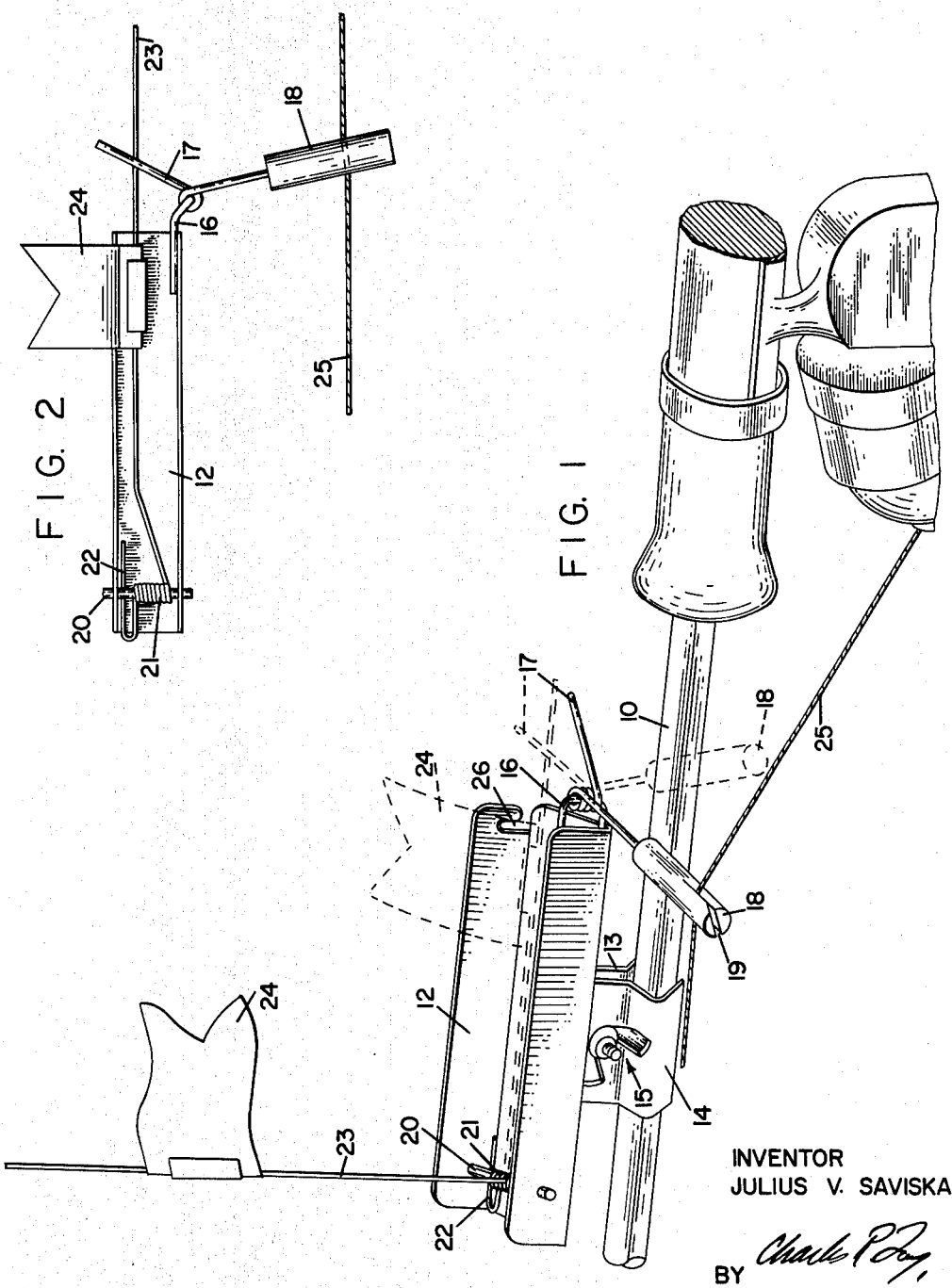
INVENTOR
JULIUS V. SAVISKAS
BY *Charles P. Fay*
ATTORNEY

3,221,705
TIP-UP SIGNAL FOR FISHING RODS
Julius V. Saviskas, 62 Granite St., Worcester, Mass.
Filed Apr. 5, 1965, Ser. No. 445,640
5 Claims. (Cl. 116—132)

This invention relates to a new and improved tip-up signal for fishing rods and comprises a very inexpensive but efficient tip-up signal device for direct mounting on a shaft of a fishing rod and including a channel-shaped member having a bracket, the bracket being detachably mounted on the rod and the U-shaped member containing adjacent an end thereof a pivot pin on which is mounted a spring-pressed flagstaff having a flag or the like on it acting as the signal. Adjacent the other end it is provided with a tipping or trigger member which has a position wherein it can overlie the flagstaff when the flagstaff is down and under tension by its spring, which normally urges it to pivot in an upward direction out of the channel; in combination with new and improved means for attaching the fishing line to the trigger member quickly and easily in a way that it can be instantly detached if so desired, the fishing line actuating the trigger when the fish pulls on it to release the staff so that it pops up.

Other objects and advantages of the invention will appear hereinafter.

Reference is to be had to the accompanying drawings in which:

FIG. 1 is a perspective view illustrating the construction and operation of the present invention, and FIG. 2 is a plan view thereof.

In illustrating this invention, the reference numeral 10 indicates the shaft of any kind of ordinary fishing rod which may have a usual handle and reel for the line, these being of any well known description.

The reference numeral 12 indicates an elongated channel member which has secured at its under surface a pair of plates 13 and 14 forming between them a clamp tightened by a screw and wing nut generally indicated at 15 so that the channel is mounted on the fishing rod shaft substantially parallel thereto with the channel being open in an upward direction.

At the rear end of the channel as respects the fishing rod there is provided a U-shaped bracket or the like 16 and mounted to swing on this on a vertical pivot is a trigger 17 conveniently made of wire. This wire has an elastomeric handle 18 which is of plastic, rubber or the like, and it is provided with an inwardly directed slit or slot 19 which is open at the end of the rubber or plastic handle opposite the trigger member 17. This trigger is shown in its two positions in solid and dotted lines in FIG. 1, and the slit 19 is preferably tapered.

There is a cross pin 20 mounted on the sides of the channel member near one end, and this mounts a coil spring 21 which is wrapped around it and has a projecting portion 22 which engages the bottom of the channel member. This is at one end of the spring and the other end of the spring is conveniently formed into a staff 23 which has on it a flag 24 or the like.

It will be seen that the staff 23 is normally urged to its upright position shown in solid lines in FIG. 1 but it can be moved down against the tension of its spring to lie in the dotted line position where it can be frictionally held by the pivoted trigger member 17 also shown in this holding position in dotted lines.

The fishing line is shown at 25. This line is conveniently slid into the slot 19 where it is resiliently held and the advantage of this construction is that the line can be pressed as hard as may be desired into the slit, and the harder it is pressed in, the more difficult it is going to be for the fish to pull the line from the slot.

On the other hand, when the parts are in the dotted line position in FIG. 1, even a light pull by a fish will cause the handle 18 to move from dotted to solid line position, thus releasing the trigger 17 from the staff 23 and allowing the spring 21 to cause the staff 23 to become erect. Further pull releases the line from the handle, and the fish can run, unreeling the line.

Additional tension can be applied to this arrangement merely by bending the trigger 17 downwardly in such a way as to more closely engage the staff 23. This depends on the degree of pressure of the trigger 17 on the staff 23.

There is provided an L-shaped slot 26 in which the end of the trigger 17 can be locked if it should be desired to immobilize the trigger for storage and transportation purposes.

Also it will be seen that it is very easy to detach the line 25 from the holder handle 18 in case it is desired to use the fishing rod and line in the usual manner. It will be noted that one of the advantages of this invention resides in the fact that the bait can be cast in the usual manner with the line not connected in any way with the holder 18, but when the bait has been placed where desired, then it is a very simple matter for the fisherman to merely engage the line in the slit 19, and then the device will operate as described but of course with the bait at some distance from the rod.

Having thus described my invention and the advantages thereof, I do not wish to be limited to the details herein disclosed, otherwise than as set forth in the claims, but what I claim is:

1. A tip-up signal device adapted to be mounted directly on the shaft of a fishing rod and comprising an elongated channel-shaped member opening upwardly, a clamp on said member for detachably mounting the same on a fishing rod, a pivoted staff, means mounting said staff on said channel-shaped member, spring means urging said staff to an erect position generally at right angles to the length of said channel-shaped member, a pivoted trigger, means pivoting said trigger on an axis generally transverse to the fishing rod, said trigger having a part adapted to overlie the staff when the staff is pivoted down against the action of the spring into the channel-shaped member, so that the staff is held down by friction, a handle for said trigger, and means on said handle for releasable attachment of a fishing line thereto at the opposite side of the pivot of the trigger from the part thereof that overlies the spring-pressed staff, the action of the fish in taking the bait pivoting said trigger to a released position when the staff snaps up.

2. The tip-up signal device of claim 1 wherein the releasable attachment means comprises a slot in said handle, the line being frictionally held in said slot or selectively removed therefrom merely by pulling on it.

3. The tip-up signal device of claim 1 wherein said releasable attachment means comprises a slit in said handle, said handle being of an elastomeric material so that the line may be pressed into said slit with varying pressure and held thereby to an increased or decreased degree.

4. The tip-up signal device of claim 1 wherein said releasable attachment means comprises a slit in said handle, said handle being of an elastomeric material so that the line may be pressed into said slit with varying pressure and held thereby to an increased or decreased degree, said slit being tapered.

5. The tip-up signal device of claim 1 wherein said trigger comprises a wire member which is bendable in a direction to bear more or less heavily against the staff when the staff is in its held position.

No references cited.

LOUIS J. CAPOZI, *Primary Examiner.*